(12) United States Patent
Graham et al.

(10) Patent No.: US 9,651,176 B2
(45) Date of Patent: May 16, 2017

(54) ELONGATE ELEMENT FOR FLEXIBLE PIPE BODY AND METHOD

(71) Applicant: Wellstream International Limited, Tyne and Wear (GB)

(72) Inventors: Geoffrey Stephen Graham, Tyne and Wear (GB); George Henry Frank Hatherley, Tyne and Wear (GB)

(73) Assignee: GE OIL & GAS UK LIMITED, Bristol (GB)

( * ) Notice: Subject to any disclaimer, the term of this patent is extended or adjusted under 35 U.S.C. 154(b) by 312 days.

(21) Appl. No.: 14/368,400

(22) PCT Filed: Oct. 24, 2012

(86) PCT No.: PCT/GB2012/052642
§ 371 (c)(1),
(2) Date: Jun. 24, 2014

(87) PCT Pub. No.: WO2013/098545
PCT Pub. Date: Jul. 4, 2013

(65) Prior Publication Data
US 2014/0373963 A1 Dec. 25, 2014

(30) Foreign Application Priority Data
Dec. 28, 2011 (GB) .................................. 1122356.7

(51) Int. Cl.
*F16L 55/16* (2006.01)
*F16L 11/12* (2006.01)
(Continued)

(52) U.S. Cl.
CPC .......... *F16L 11/12* (2013.01); *B29C 35/0272* (2013.01); *B29C 35/0805* (2013.01);
(Continued)

(58) Field of Classification Search
USPC .............................. 138/104, 97, 98, 108, 129
See application file for complete search history.

(56) References Cited

U.S. PATENT DOCUMENTS 5,172,730 A * 12/1992 Driver ..................... G01M 3/18
138/103
5,399,854 A * 3/1995 Dunphy ................... G01K 5/72
250/227.14
(Continued)

FOREIGN PATENT DOCUMENTS

EP 2 270 379 A1 1/2011
JP 11-198231 A 7/1999
(Continued)

OTHER PUBLICATIONS

Chinese Office Action and Search Report for corresponding Chinese Application No. 201280065070.4 dated Sep. 22, 2015.
(Continued)

*Primary Examiner* — James Hook
(74) *Attorney, Agent, or Firm* — Renner, Otto, Boisselle & Sklar, LLP

(57) ABSTRACT

An elongate element (300) for a flexible pipe body (100) and method of producing the same are disclosed. The method includes inserting a first fiber element (304) in a crush resistant elongate tube element (302), wherein the first fiber element is suitable for monitoring at least one of strain, temperature and acoustic properties; inserting a further fiber element (306) in the tube element, wherein the further fiber element is suitable for curing a matrix material (308); and inserting a matrix material into the tube element to fill at least a length of the tube element such that the first and further fibers elements within that length are surrounded by matrix material.

22 Claims, 7 Drawing Sheets

Figure 1:
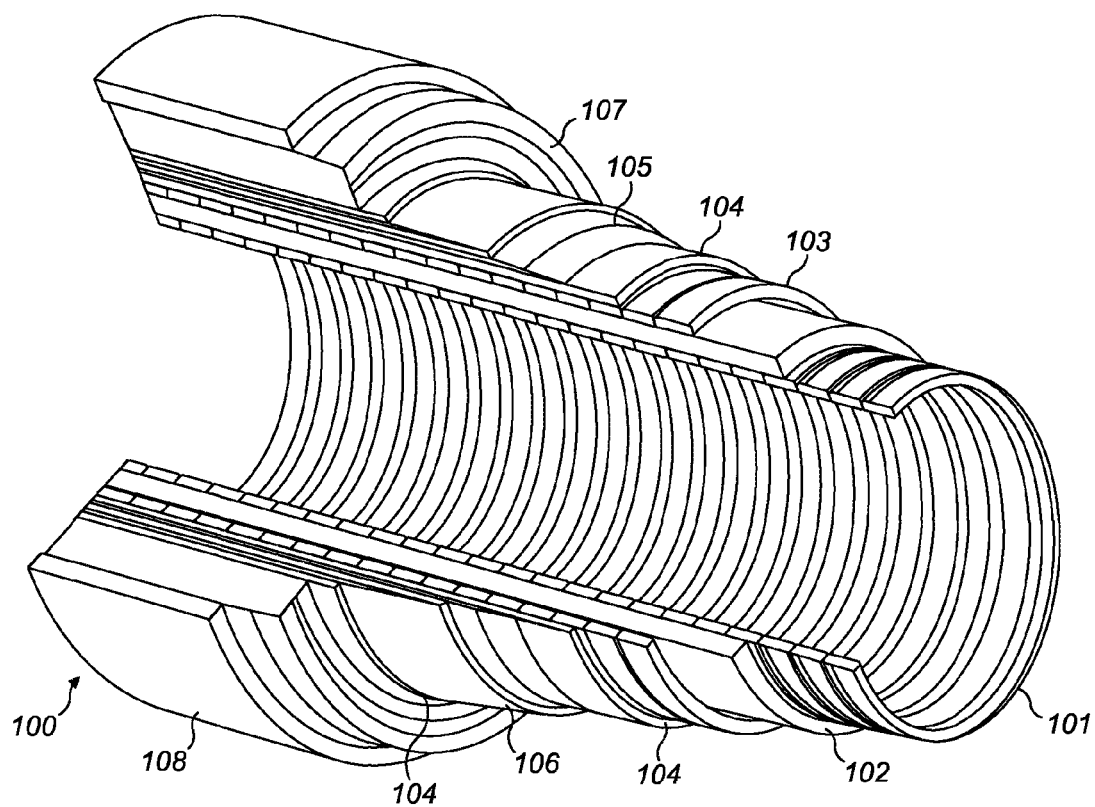

(51) Int. Cl.
*B29C 35/02* (2006.01)
*G01D 11/24* (2006.01)
*E21B 47/00* (2012.01)
*E21B 47/01* (2012.01)
*E21B 17/01* (2006.01)
*F16L 11/08* (2006.01)
*B29D 11/00* (2006.01)
*B29D 23/00* (2006.01)
*B29C 35/08* (2006.01)
*G01D 5/353* (2006.01)
*B29L 9/00* (2006.01)

(52) U.S. Cl.
CPC ........ *B29D 11/0074* (2013.01); *B29D 23/001* (2013.01); *E21B 17/01* (2013.01); *E21B 47/0006* (2013.01); *E21B 47/01* (2013.01); *F16L 11/083* (2013.01); *G01D 11/245* (2013.01); *B29C 2035/0827* (2013.01); *B29L 2009/00* (2013.01); *G01D 5/35303* (2013.01)

(56) References Cited

U.S. PATENT DOCUMENTS

| | | | | |
|---|---|---|---|---|
| 5,971,029 | A * | 10/1999 | Smith | F16L 11/20 138/113 |
| 6,305,427 | B1 * | 10/2001 | Priest, II | F16L 11/12 138/104 |
| 7,025,580 | B2 * | 4/2006 | Heagy | B29C 63/34 138/108 |
| 2002/0007945 | A1 | 1/2002 | Neuroth et al. | |
| 2004/0021255 | A1 | 2/2004 | Bilanin et al. | |
| 2006/0151044 | A1 * | 7/2006 | Gurov | F16L 9/00 138/129 |
| 2008/0306177 | A1 * | 12/2008 | Deuchar Care | B29C 35/0266 522/1 |
| 2009/0308475 | A1 * | 12/2009 | Stringfellow | B29C 63/343 138/98 |
| 2010/0269941 | A1 * | 10/2010 | Hara | G01M 3/047 138/97 |
| 2013/0089287 | A1 * | 4/2013 | Glombitza | F16L 55/1651 385/12 |

FOREIGN PATENT DOCUMENTS

WO  WO 2009/068907 A1  6/2009
WO  WO 2009/119297 A1  10/2009
WO  WO 2012/059729 A1  5/2012

OTHER PUBLICATIONS

International Search Report and Written Opinion for corresponding International Application No. PCT/GB2012/052642 mailed Mar. 15, 2013.
International Preliminary Report on Patentability for corresponding International Application No. PCT/GB2012/052642 dated Jul. 10, 2014.

* cited by examiner

ELONGATE ELEMENT FOR FLEXIBLE PIPE BODY AND METHOD

This invention relates to an elongate element for a flexible pipe body and method of producing the same. Particularly, but not exclusively, the invention relates to the monitoring of parameters such as strain, temperature and/or acoustics in a flexible pipe. The parameters may be monitored in situ in flexible pipes in the oil and gas industry, for example.

There are many technical fields in which it is useful from time to time or continuously to monitor one or more parameters associated with a structure. For example, from time to time bridges, road surfaces, regions of land, lamp-posts, wind turbine blades, yacht masts, suspended power cables or the like should be repeatedly or continuously monitored so that information identifying any potential problems with the structure can be identified and then remedial action taken.

Traditionally flexible pipe is utilised to transport production fluids, such as oil and/or gas and/or water, from one location to another. Flexible pipe is particularly useful in connecting a sub-sea location (which may be deep underwater, say 1000 meters or more) to a sea level location. The pipe may have an internal diameter of typically up to around 0.6 meters. Flexible pipe is generally formed as an assembly of a flexible pipe body and one or more end fittings. The pipe body is typically formed as a combination of layered materials that form a pressure-containing conduit. The pipe structure allows large deflections without causing bending stresses that impair the pipe's functionality over its lifetime. The pipe body is generally built up as a combined structure including metallic and polymer layers.

Nonetheless, it will be appreciated that harsh environmental conditions are present at such operating depths under the sea, including not only high pressures and strong tidal movement but also man-made conditions such as collision with passing vehicles and so on.

In relation to all structures, many different forces will be experienced. This can lead to very complex loads and includes, but is not limited to, self-weight, internal pressure, tension, vortex induced vibration, flexing, twisting or the like.

There is an increasing desire for the continual monitoring of various parameters of flexible pipes, such as strain, temperature and acoustics, to help detect structural failures in the pipe. Such structural failure could be leakage, wire breakage, over-bending in the pipe (i.e. bending past the maximum allowable amount before which damage will occur), and interaction between the pipe and external environment such as collisions with other objects, for example.

One way which has been suggested for monitoring parameters associated with such structures is the use of an optical fibre system. As a method of monitoring strain, temperature and acoustics in flexible pipe, bare fibres and/or fibres in metal tubes (FIMT) within a protective conduit have been incorporated along the length of the pipe structure and connected to an interrogating device external of the pipe. The fibre is used as an optical fibre for transmitting light and is generally made of glass. The optical fibres can be used as strain gauges, temperature gauges, temperature indicators and strain measurements can be made which are either localised, distributed or semi-distributed depending upon the manner in which the optical fibre is interrogated and regions/sensors in the optical fibre are arranged. The fibres may include Bragg Gratings whereby differential diffraction of light passing down the fibre is used to measure the necessary parameter. Output readings can be analysed to determine the conditions of the pipe over a time period and corrective action can be taken accordingly. WO2009/068907, the disclosure of which is incorporated herein in its entirety, discloses a way in which an optical fibre can be wrapped around a flexible pipe and certain measurements taken from which parameters associated with the pipe can be determined.

Whilst such a system does enable certain parameters associated with the pipe to be determined there are limits within which such an optical system can be used. One reason for this is because optical fibres are inherently relatively fragile and if the underlying structure which is being monitored is prone to substantial mechanical movement then mechanical stresses and strains can be induced in the fibre which causes fibre failure. Therefore, the use of optical fibre has until now been limited to uses where the movement of the optical fibres has been unduly limited.

Strain limitations based on the Ultimate Tensile Strain (UTS) of fibre optic cables are currently in the region of 1% according to manufacturers recommendations. The use of commercially available optical fibres to measure strains above 1% thus requires a method of reducing the amount of strain that the fibre is subjected to thereby increasing its capability to measure strain levels beyond its UTS limit.

Known methods may use the pressure armour and/or tensile armour wires to carry the conduit. A groove is formed into the side edge of the wire form, into which the conduit is laid and bonded into position. When the pipe is subjected to forces, the conduit therefore experiences the same conditions via this bond to the wires. The fibres etched with Bragg gratings, which are bonded to the inside of the conduit, record the movement experienced by the conduit and thus strain monitoring is achieved.

Temperature can be monitored by including a FIMT that is not bonded to the inside of the conduit, and is therefore able to record temperature independently to strain. Fibres can be configured in a similar manner to monitor acoustic conditions.

It can be difficult to incorporate the fibres into a structure such as a flexible pipe without causing damage to the fibre. Current manufacturing methods have demonstrated the ease with which the steel tube can be terminated. Fibres which are not bonded to the steel tube can be used to determine temperature or measure acoustic signals; however to measure strain they must be anchored to the tube and will therefore be subjected to instances of load transfer from the tube.

In addition, it can be difficult to manufacture a FIMT in which the fibre is bonded to the tube without unduly straining the fibre.

It is an aim of the present invention to at least partly mitigate the above-mentioned problems.

It is an aim of embodiments of the present invention to provide a conduit containing a fibre to be incorporated into a pipe structure relatively easily during manufacture compared to known configurations.

It is an aim of embodiments of the present invention to provide a conduit containing a fibre to be incorporated into a pipe structure such that disassembly of the pipe structure when pipe layers are incorporated with an end fitting installation is relatively easy.

It is an aim of embodiments of the present invention to provide a method of producing a fibre in a tube (e.g. a FIMT) for monitoring one or more parameter of a flexible pipe body in which the fibre is fitted free from or under minimal strain into the tube.

According to a first aspect of the present invention there is provided a method for manufacturing a flexible pipe body, comprising:

inserting a first fibre element along a crush resistant elongate tube element, wherein the first fibre element is suitable for monitoring at least one of strain, temperature and acoustic properties;

inserting a further fibre element along the tube element, wherein the further fibre element is suitable for curing a matrix material; and inserting a matrix material into the tube element to fill at least a length of the tube element such that the first and further fibres elements within that length are surrounded by matrix material.

According to a second aspect of the present invention there is provided an elongate element for a flexible pipe body, comprising:

a crush resistant elongate tube element;

a first fibre element provided in the tube element, wherein the first fibre element is suitable for monitoring at least one of strain, temperature and acoustic properties;

a further fibre element provided in the tube element, wherein the further fibre element is suitable for curing a matrix material; and a matrix material provided in the tube element filling at least a length of the tube element such that the first and further fibres elements within that length are surrounded by matrix material.

Certain embodiments of the invention provide the advantage that the matrix material surrounding the fibre element remains uncured during the main part of the manufacture of the elongate element, and then later cured after assembly. Therefore, the strain monitoring fibre is subject to zero or very little strain itself during the manufacturing process, thereby increasing the strain envelope for its useful life. In addition, the fibre element for measuring strain or the like can be more easily handled when retrieving and connecting to a measurement device during assembly into a flexible pipe apparatus, whilst the matrix material is in a flowable form. Then once the steps requiring handling and movement of the fibre element have been completed, the matrix material can be cured into position using the further fibre element.

Certain embodiments of the invention provide the advantage that one fibre element is useable for monitoring a parameter such as strain, and another fibre element is useable to cure the surrounding matrix material.

Certain embodiments of the invention provide the advantage that a parameter such as strain, temperature and the like can be monitored in a flexible pipe continuously or repeatedly, at desired times or when triggered by the occurrence of a predetermined event.

Certain embodiments of the invention provide the advantage that a fibre element for measuring parameters such as strain, temperature and the like can be incorporated into a flexible pipe body relatively cheaply and conveniently. Certain embodiments provide this advantage without requiring additional forming steps to prepare a groove for the fibre to be housed in.

Figure 2:
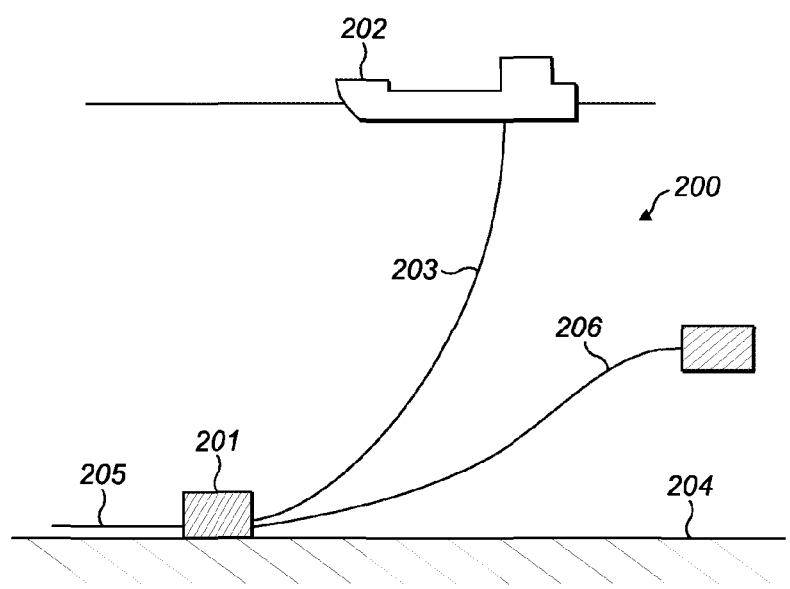
Figure 3A:
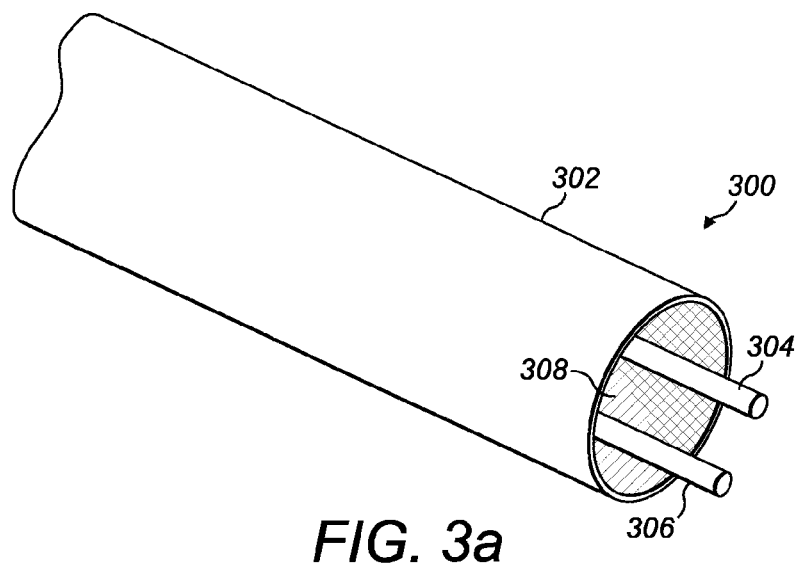
Figure 3B:
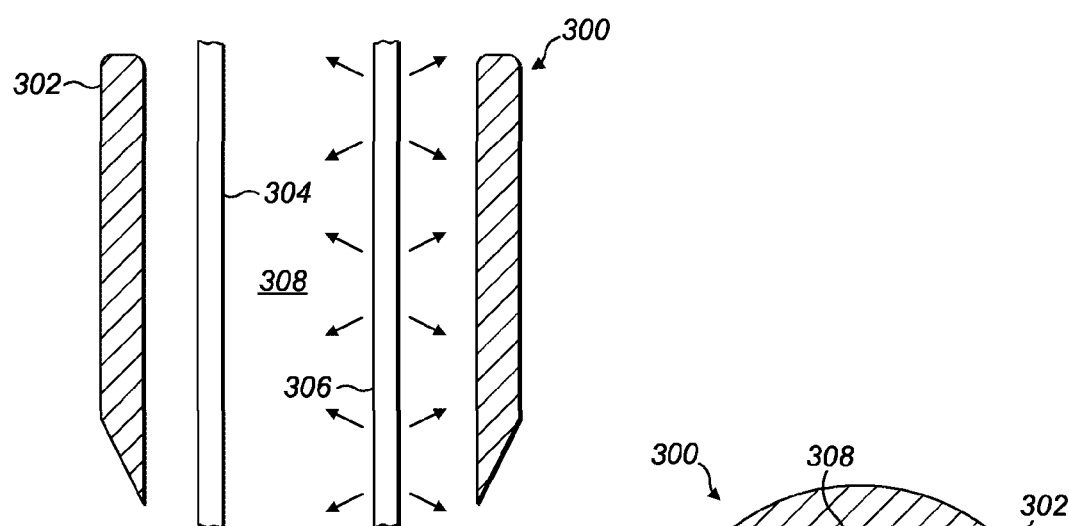
Figure 3C:
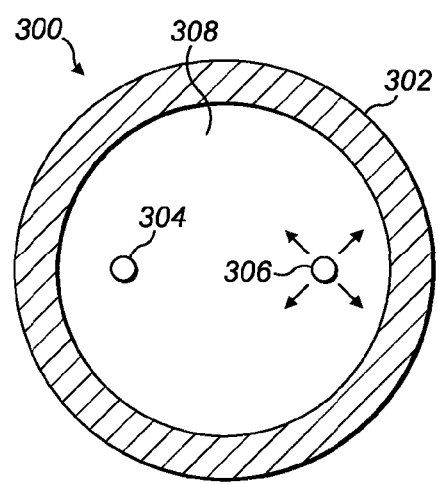
Figure 4:
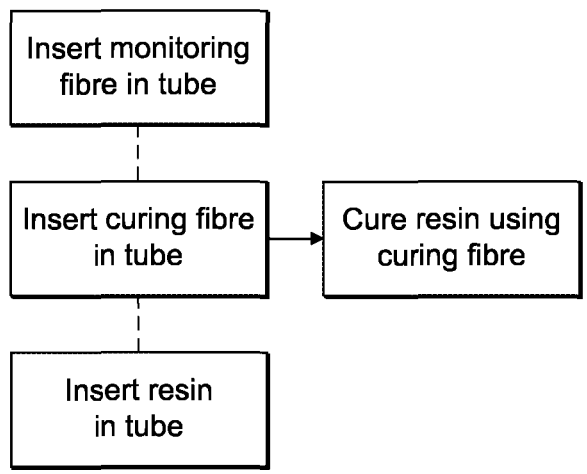
Figure 5:
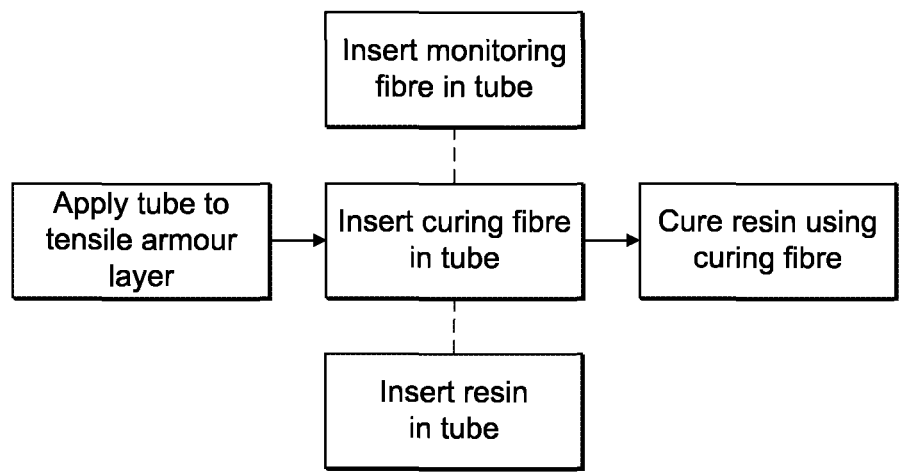
Figure 6:
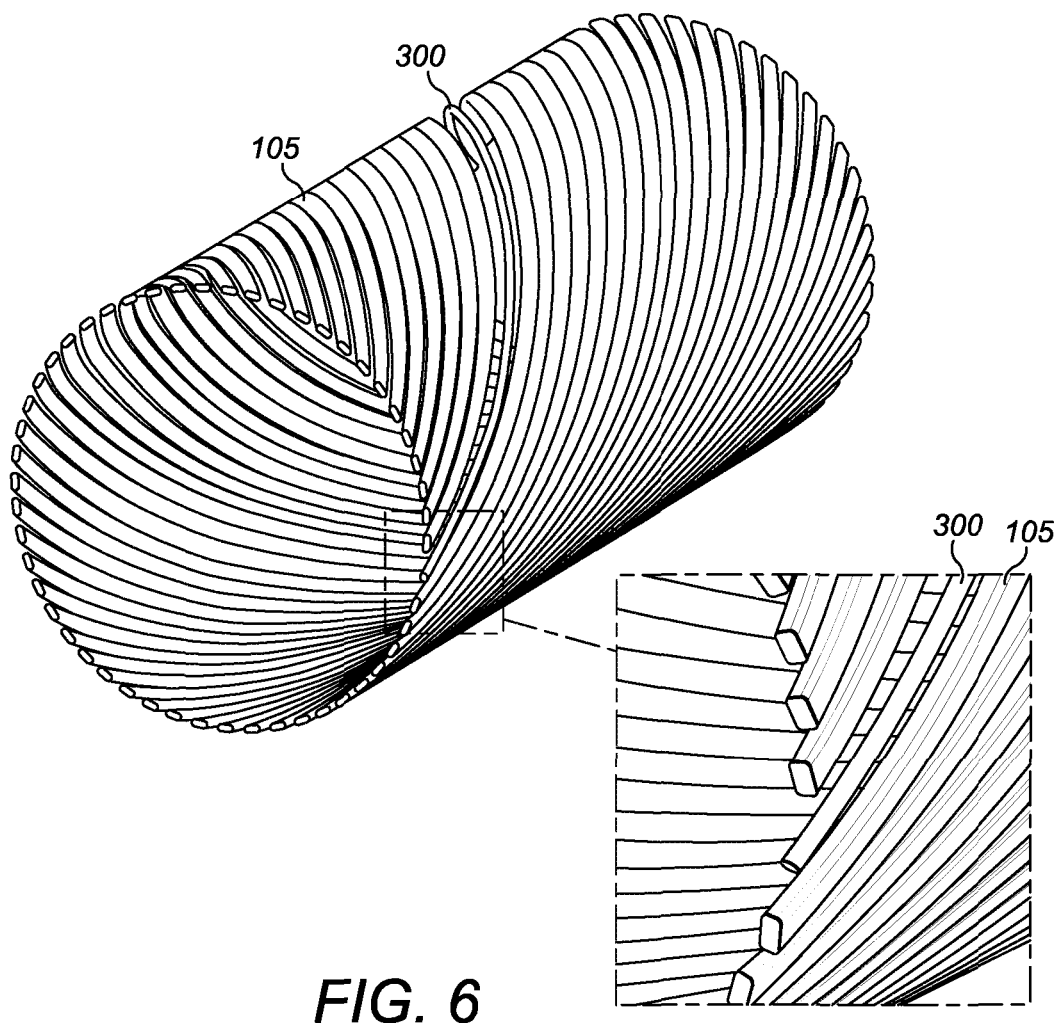
Figure 7:
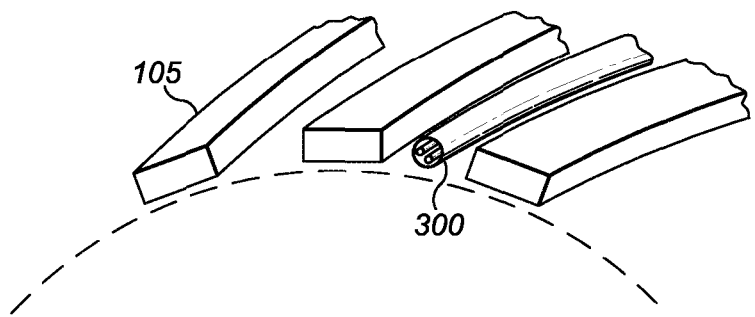
Figure 8:
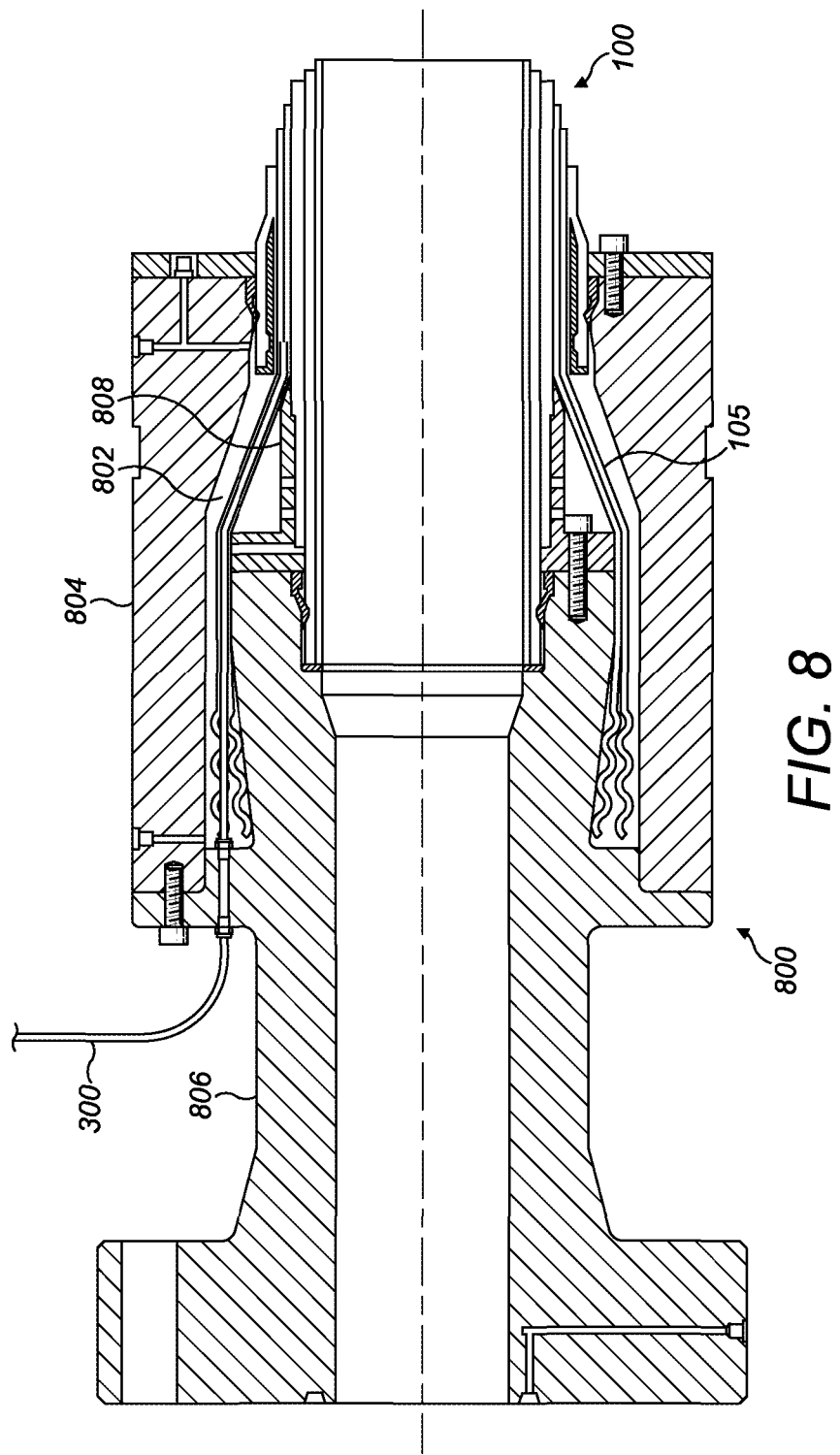
Figure 9A:
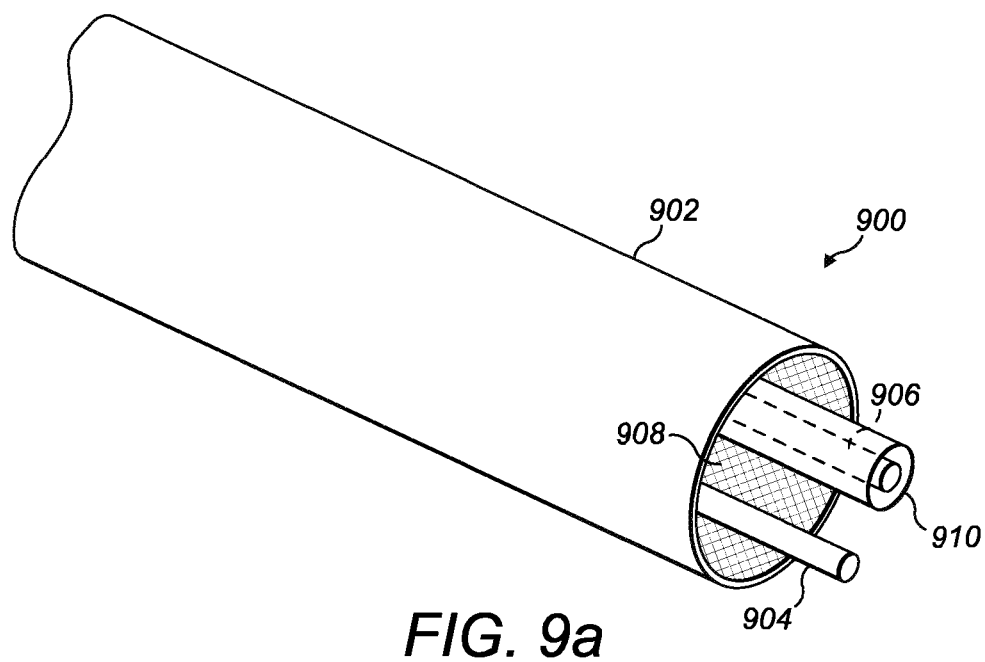
Figure 9B:
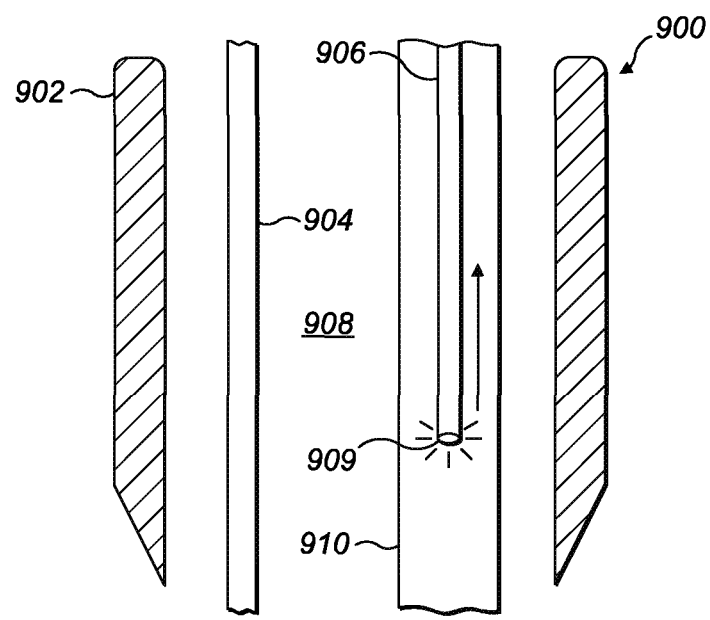
Figure 9C:
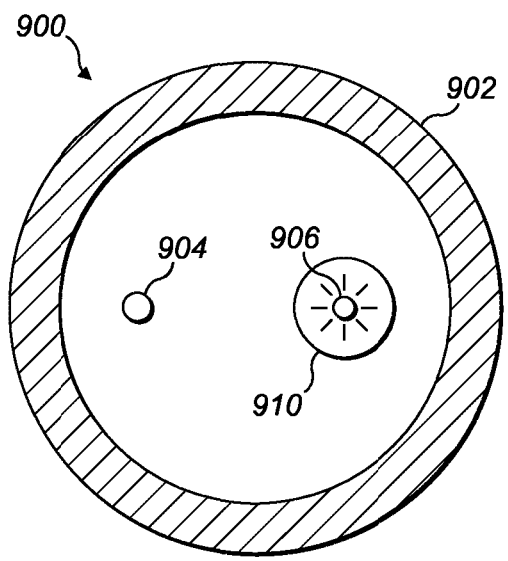
Figure 10:
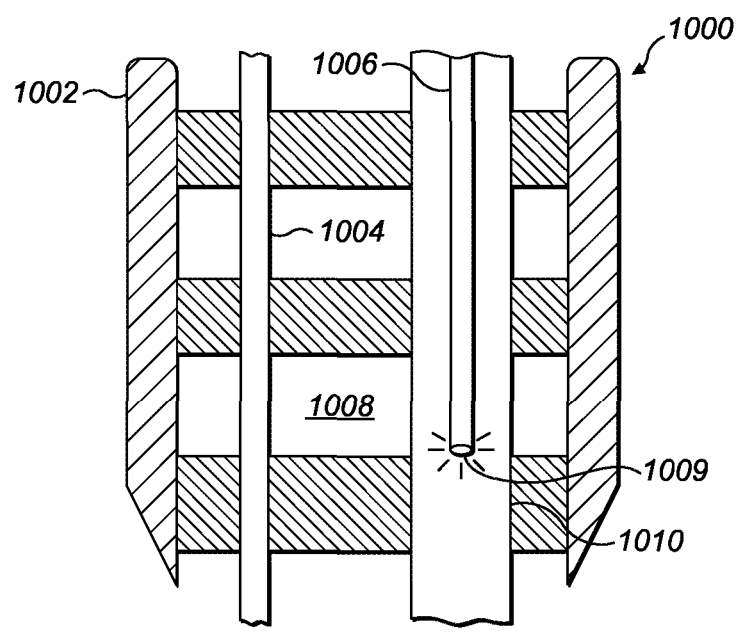

Embodiments of the invention are further described hereinafter with reference to the accompanying drawings, in which:

FIG. 1 illustrates a flexible pipe body;
FIG. 2 illustrates a riser assembly;
FIGS. 3a to 3c illustrate an elongate element;
FIG. 4 illustrates a method of the present invention;
FIG. 5 illustrates another method of the present invention;
FIG. 6 illustrates a fibre containing element in position in a tensile armour layer of a flexible pipe body;
FIG. 7 illustrates another fibre containing element in position in a tensile armour layer of a flexible pipe body;
FIG. 8 illustrates a pipe body terminated in an end fitting;
FIGS. 9a to 9c illustrate another elongate element; and
FIG. 10 illustrates a cross section of another elongate element.

In the drawings like reference numerals refer to like parts.

Throughout this description, reference will be made to a flexible pipe. It will be understood that a flexible pipe is an assembly of a portion of a pipe body and one or more end fittings in each of which a respective end of the pipe body is terminated. FIG. 1 illustrates how pipe body 100 is formed in accordance with an embodiment of the present invention from a combination of layered materials that form a pressure-containing conduit. Although a number of particular layers are illustrated in FIG. 1, it is to be understood that the present invention is broadly applicable to coaxial pipe body structures including two or more layers manufactured from a variety of possible materials. It is to be further noted that the layer thicknesses are shown for illustrative purposes only.

As illustrated in FIG. 1, a pipe body includes an optional innermost carcass layer 101. The carcass provides an interlocked construction that can be used as the innermost layer to prevent, totally or partially, collapse of an internal pressure sheath 102 due to pipe decompression, external pressure, and tensile armour pressure and mechanical crushing loads. It will be appreciated that certain embodiments of the present invention are applicable to 'smooth bore' operations (i.e. without a carcass) as well as such 'rough bore' applications (with a carcass).

The internal pressure sheath 102 acts as a fluid retaining layer and comprises a polymer layer that ensures internal fluid integrity. It is to be understood that this layer may itself comprise a number of sub-layers. It will be appreciated that when the optional carcass layer is utilised the internal pressure sheath is often referred to by those skilled in the art as a barrier layer. In operation without such a carcass (so-called smooth bore operation) the internal pressure sheath may be referred to as a liner.

An optional pressure armour layer 103 is a structural layer with a lay angle close to 90° that increases the resistance of the flexible pipe to internal and external pressure and mechanical crushing loads. The layer also structurally supports the internal pressure sheath, and typically consists of an interlocked construction.

The flexible pipe body also includes an optional first tensile armour layer 105 and optional second tensile armour layer 106. Each tensile armour layer is a structural layer with a lay angle typically between 10° and 55°. Each layer is used to sustain tensile loads and internal pressure. The tensile armour layers are often counter-wound in pairs.

The flexible pipe body shown also includes optional layers of tape 104 which help contain underlying layers and to some extent prevent abrasion between adjacent layers.

The flexible pipe body also typically includes optional layers of insulation 107 and an outer sheath 108, which comprises a polymer layer used to protect the pipe against penetration of seawater and other external environments, corrosion, abrasion and mechanical damage.

Each flexible pipe comprises at least one portion, sometimes referred to as a segment or section of pipe body 100 together with an end fitting located at at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

FIG. 2 illustrates a riser assembly 200 suitable for transporting production fluid such as oil and/or gas and/or water from a sub-sea location 201 to a floating facility 202. For example, in FIG. 2 the sub-sea location 201 includes a sub-sea flow line. The flexible flow line 205 comprises a flexible pipe, wholly or in part, resting on the sea floor 204 or buried below the sea floor and used in a static application. The floating facility may be provided by a platform and/or buoy or, as illustrated in FIG. 2, a ship. The riser assembly 200 is provided as a flexible riser, that is to say a flexible pipe 203 connecting the ship to the sea floor installation. The flexible pipe may be in segments of flexible pipe body with connecting end fittings.

It will be appreciated that there are different types of riser, as is well-known by those skilled in the art. Embodiments of the present invention may be used with any type of riser, such as a freely suspended (free, catenary riser), a riser restrained to some extent (buoys, chains), totally restrained riser or enclosed in a tube (I or J tubes).

FIG. 2 also illustrates how portions of flexible pipe can be utilised as a flow line 205 or jumper 206.

FIG. 3a illustrates an elongate element 300 of an embodiment of the present invention. The element includes a crush resistant tube 302, which here is formed from metal but may alternatively be formed from a polymer or composite material for example. The tube 302 houses a first optical fibre 304 made of glass, which could be in various forms suitable to provide parameter sensing measurements. In the present example the fibre 304 includes etched Fibre Bragg Gratings, as are known in the art for monitoring purposes. The tube 302 houses a second optical fibre 306 made of glass, that has the ability, when connected to a UV light source, to emit UV light through its side walls along the length of the second fibre. The tube 302 also includes a matrix material (resin) 308, in this case an epoxy resin that is curable by UV radiation.

As shown in the cross sectional illustrations of FIGS. 3b and 3c, the second optical fibre 306 has been connected to a UV light source (not shown) and emits UV light as schematically indicated by the arrows. The UV radiation emitted by the fibre 306 is sufficient to cure the resin 308, thereby bonding both fibres 304,306 in place within the tube 302.

Since the fibre 304 is bonded along substantially the full length of the tube 302, the fibre 304 can act as a strain measuring fibre. This is because, when the fibre is locked within the tube and the tube is under strain, the loads are transferred directly to the fibre.

A method of providing an elongate tube element 300 according to the above embodiment is illustrated in FIG. 4. As shown, the first fibre 304 (the monitoring fibre), the second fibre 306 (the curing fibre) and the resin 308 can be inserted into the tube 302 in any order or at the same time. Then, the UV radiation emitted by the second fibre 306 is used to cure the resin within the tube 302.

Aptly, the first fibre and second fibre are inserted along the tube by flushing along with the resin, i.e. at the same time. Flushing is done by pumping of a fluid through the fibre containing tube. The fibre is inserted into an opening at or near the entry of a flushing fluid into the tube and is entrained by the fluid to the tube end where the flushing fluid is allowed to exit. Alternatively, the fibres can be flushed along the tube using a gas for example, and then the resin inserted into the tube.

When applying the elongate element 300 for parameter sensing in a flexible pipe body, it is advantageous to apply the element 300 to the pipe body prior to curing the resin. As shown in FIG. 5, a tube 302 may be applied to a tensile armour layer of a flexible pipe body (as described further below), then the first and second fibres 304,306 and resin 308 are applied within the tube 302 in any order or at the same time, and then the UV radiation emitted from the second fibre 306 is used to cure the resin 308, thereby bonding the entire element as a single unit.

The elongate element 300 is provided between tensile armour layers of a flexible pipe body. The elongate element 300 is wrapped around a previously formed layer (such as the fluid retaining layer, pressure armour layer or another tensile armour layer), alongside other wires of a tensile armour layer. The elongate element 300 is located radially between two tensile armour wires. Because the elongate element 300 is crush resistant, the elongate element can effectively act as another tensile armour wire, whilst also housing the necessary fibre for performing monitoring of parameters of the pipe. To ensure the crush resistance of the elongate element 300, it is possible to calculate the stiffness coefficient in at least one dimension of the tube element and/or matrix material. This is determined based on its dimensions, the cross-sectional shape of the elongate element, and the materials it is formed from, and can be calculated by a person skilled in the art according to the specific requirements of the particular application. The elongate element 300 can therefore be pre-fabricated so that its mechanical properties, when/if cured, are similar to a tensile armour wire.

In FIG. 6, a tensile armour layer is shown. An elongate element 300 is wrapped alongside tensile armour wires, in the same manner as the tensile armour wires, effectively as a replacement for one of the tensile armour wires. The elongate element is therefore located radially between two tensile armour wires. The remaining layers of the flexible pipe body are not shown.

Alternatively, as shown in FIG. 7, an elongate element 300 can be positioned in one of the gaps that will be present between tensile armour wires when there is a less than 100% fraction fill (i.e. when the tensile armour wires are not wound so as to be touching). Thus, rather than replacing a tensile wire, the elongate element is additional to all tensile wires. Ideally, the elongate element should be resistant to crushing, at least as strong as a tensile armour wire, and should also resistant to deformation or crushing by the surrounding armour wires.

As the elongate element is essentially an additional component of the tensile armour layer, rather than an integral part of a tensile wire, it can be applied at the same time as the armour wires. Wire preparation prior to manufacturing the pipe body is not required. The method of laying the elongate element with the armour wires will somewhat depend upon the geometry of the elongate element. For example, if the elongate element has a round cross section, it can be laid during the application of tensile armour wires using an additional planetary bobbin attachment to a standard flat wire machine. If the cross section of the elongate element is square, it can be laid using the same laying technique as the tensile wire, because this will not induce a twist in the elongate element.

Upon formation of a pipe body, layers are generally sequentially terminated in an end fitting. The fibre-containing elongate element 300 is therefore dealt with similarly to its surrounding armour wires, although it should be protruded from the end fitting so as to enable connection to an interrogation device (sensor monitoring unit) and UV light source.

FIG. 8 shows a pipe body 100 terminated in an end fitting 800. The tensile armour wires 105 are gently peeled away from their natural pathway and terminated in a cavity 802 formed between an inner surface of a housing 804 of the end fitting and the end fitting body 806 and a collar member 808. The elongate element 300 is inserted through a hole in the end fitting body 806 so that it can be connected to an interrogation device and UV light source (not shown). The hole may be a standard port fitted with olives to lock the elongate element at the end fitting (to prevent slipping) and to prevent seawater entry to the internal elements. The interrogation device and UV light source could be located at the sea surface to allow direct access. The cavity 802 can be filled with epoxy resin to retain the armour wires in position.

During installation of the elongate element through the end fitting, it is useful for the elongate element to be handled as a separate element to the armour wires. Handling is therefore easier than known methods where sensing elements are joined to armour wire.

The first optical fibre 304 may be looped or spliced to provide a return up the same elongate element. A laser can send light pulses down the optical fibre and a detector can measure the reflections from each light pulse. The interrogation device can then analyse these results to determine strain, for example.

The finished pipe assembly can then be used for fluid transport, whilst being continually or periodically monitored for strain, etc. Readings could be linked to an alarm system to notify users in the event of an adverse reading outside predetermined acceptable limits.

FIG. 9a illustrates an elongate element 900 of another embodiment of the present invention. The element includes a crush resistant tube 902, which here is formed from metal. The tube 902 houses a first optical fibre 904 made of glass, which could be in various forms suitable to provide parameter sensing measurements. In the present example the fibre 904 includes etched Fibre Bragg Gratings, as are known in the art for monitoring purposes. The tube 902 houses a second optical fibre 906 made of glass, that has the ability, when connected to a UV light source, to emit UV light. The tube 902 also includes a matrix material (resin) 908, in this case an epoxy resin that is curable by UV radiation. In this embodiment, the second fibre 906 is encased within a transparent housing tube 910.

As shown in the cross sectional illustrations of FIGS. 9b and 9c, the second optical fibre 906 has been connected to a UV light source (not shown) and emits UV light from only its end region 909. That is, the second fibre 906 is of a different type to the fibre 306 in that UV light is not emitted from its full length. The UV radiation emitted by the fibre 906 is sufficient to cure the resin 908 in the vicinity of the end region 909. The cured resin will thereby bond the fibre 904 and the transparent tube 910 into place in the tube 902.

As depicted by the arrow in FIG. 9b, the second fibre 906 can be drawn along within the elongate element 900 at a predetermined speed to cure the resin 908 along the full length of the elongate element 900.

When applying the elongate element 900 to a flexible pipe body for example, this may be performed as described above with respect to any of FIGS. 4 to 8.

In an alternative embodiment as shown in the cross sectional diagram of FIG. 10, elongate element 1000 includes a crush resistant tube 1002, a first optical fibre 1004 and a second optical fibre 1006, that has the ability, when connected to a UV light source, to emit UV light from the end region 1009 of the fibre. The tube 1002 also includes a matrix material 1008 that is curable by UV radiation. The second fibre 1006 is encased within a transparent housing tube 1010. The UV light source (not shown) that is connected to the second fibre 1006 is controllable so as to allow UV radiation to be emitted at selected time periods. The selected time periods can be determined to correspond with areas along the length of the elongate element 1000 that the user wishes to cure. As shown in FIG. 10, the cross-hatched areas of the matrix material 1008 represent areas that have been cured and the remaining areas represent areas that have not been cured.

By providing areas along the elongate element that have not been cured, this may enable temperature readings to be monitored, for example, since the fibre 1004 is not bonded to its surrounding material.

In a yet further embodiment of the present invention, the second fibre 306 for example may be masked off in selected areas, to prevent UV light from being emitted from those selected areas. This will achieve a similar affect to the embodiment described above in respect to FIG. 10.

With the above described invention, the optical fibre used for monitoring parameters such as strain is located in place in a tube element and then curing takes place after the main part of the assembly has taken place. As such, the optical fibre, which may be delicate, does not undergo excessive strain during the manufacturing process whilst bonded to another object.

As such, assembly of a fibre optic monitoring apparatus can be made simpler to handle and less likely to be damaged.

The apparatus may be used for monitoring strain and/or temperature and/or acoustic properties in a flexible pipe body, for example.

Various modifications to the detailed designs as described above are possible. For example, although the elongate element has been described above as used as part of a tensile armour layer of a flexible pipe body, the element could be applied to any suitable layer of a flexible pipe body, or in other apparatus for monitoring parameters such as strain, temperature and acoustics, for example.

It will be noted that although the elongate element of the present invention may be referred to as a FIMT in the general sense, the tube need not be metal but is preferably resistant to crushing loads, and may share other similar properties with a FIMT.

Although the method shown in FIG. 4 illustrates that a tube may be positioned within the tensile armour layer, then have the necessary fibres and resin inserted before curing the resin, alternatively the tube could be first assembled to include the fibres and resin, and then applied to the tensile armour layer, and then have the resin cured.

Alternatively, a bundle of fibres including a monitoring fibre and a curing fibre could be prepared with a loose jacketed fibre to measure strain. The bundle could be pre-impregnated with a resin for binding together, and the whole bundle flushed into the tube.

The curing fibre could then be employed to bond the fibres into the tube.

In addition to any of the above described embodiments, further monitoring fibres can be used, including for example a loose fibre having an outer layer, such as a FIMT, which can be used for temperature measurement and monitoring.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method for manufacturing an elongate element for a flexible pipe body, comprising:
   inserting a first fibre element along a crush resistant tube element, wherein the first fibre element is suitable for monitoring at least one of strain, temperature and acoustic properties;
   inserting a further fibre element along the tube element, wherein the further fibre element is suitable for curing a matrix material;
   inserting a matrix material into the tube element to fill at least a length of the tube element such that the first and further fibres elements within that length are surrounded by matrix material; and
   curing the matrix material using the further fibre element.

2. A method as claimed in claim 1, wherein the further fibre element is a UV emitting fibre.

3. A method as claimed in claim 2 further comprising curing the matrix material using the further fibre element, wherein the step of curing the matrix material comprises connecting the further fibre element to a UV light source and emitting UV light from the further fibre element.

4. A method as claimed in claim 3, wherein emitting UV light from the further fibre element comprises emitting UV light along substantially the full length of the further fibre element.

5. A method as claimed in claim 3, wherein emitting UV light from the further fibre element comprises emitting UV light along selected portions of the length of the further fibre element.

6. A method as claimed in claim 5 further comprising applying a masking element around selected portions of the further fibre element.

7. A method as claimed in claim 3, wherein emitting UV light from the further fibre element comprises emitting UV light from an end portion of the further fibre element, and further comprising the step of withdrawing the further fibre element from the tube at a predetermined speed.

8. A method as claimed in claim 7 further comprising emitting UV light at selected time periods and emitting no UV light at other selected time periods.

9. A method as claimed in claim 7, further comprising providing a transparent tube within the tube element, wherein the step of inserting a further fibre element along the tube comprises inserting the further fibre element along the transparent tube.

10. A method as claimed in claim 1, wherein the steps of inserting a first fibre element, a further fibre element and a matrix material are performed at the same time.

11. A method as claimed in claim 10 wherein the first fibre element and further fibre element are inserted along the tube element by flushing with the matrix material.

12. A method as claimed in claim 1 wherein the steps of inserting a first fibre element and a further fibre element comprises flushing the fibre elements along the tube element with a gas, prior to the step of inserting the matrix material.

13. A method as claimed in claim 1, wherein the tube element comprises metal, polymer, or a composite material.

14. A method as claimed in claim 1 further comprising applying the crush resistant tube element to a portion of a flexible pipe body.

15. A method as claimed in claim 14, wherein applying the crush resistant tube element to a portion of a flexible pipe body comprises wrapping the tube element between adjacent tensile armour elements.

16. An elongate element for a flexible pipe body, comprising:
   a crush resistant tube element;
   a first fibre element provided in the tube element, wherein the first fibre element is suitable for monitoring at least one of strain, temperature and acoustic properties;
   a further fibre element provided in the tube element, wherein the further fibre element is suitable for curing a matrix material; and
   a matrix material provided in the tube element filling at least a length of the tube element such that the first and further fibres elements within that length are surrounded by matrix material, wherein said matrix material is cured using the further fibre element.

17. A flexible pipe body as claimed in claim 16, wherein the further fibre element is a UV emitting fibre.

18. A flexible pipe body as claimed in claim 16 wherein the matrix material is cured substantially completely.

19. A flexible pipe body as claimed in claim 16 wherein the matrix material is cured along selected portions of the length of the tube element.

20. A flexible pipe body as claimed in claim 16, further comprising a transparent tube within the tube element for housing the further fibre element.

21. A flexible pipe body as claimed in claim 16 wherein the tube element comprises metal, polymer or a composite material.

22. A flexible pipe body as claimed in claim 16 wherein the tube element is provided between adjacent tensile armour elements of a flexible pipe body.

* * * * *